(12) United States Patent
Bellofatto et al.

(10) Patent No.: US 7,797,503 B2
(45) Date of Patent: Sep. 14, 2010

(54) CONFIGURABLE MEMORY SYSTEM AND METHOD FOR PROVIDING ATOMIC COUNTING OPERATIONS IN A MEMORY DEVICE

(75) Inventors: Ralph E. Bellofatto, Ridgefield, CT (US); Alan G. Gara, Mount Kisco, NY (US); Mark E. Giampapa, Irvington, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/768,812

(22) Filed: Jun. 26, 2007

(65) Prior Publication Data

US 2009/0006800 A1    Jan. 1, 2009

(51) Int. Cl.
  *G06F 12/00* (2006.01)
(52) U.S. Cl. ........................ 711/163; 711/170

(58) Field of Classification Search ........... 711/163, 711/170
See application file for complete search history.

(56) References Cited

U.S. PATENT DOCUMENTS

| | | | |
|---|---|---|---|
| 7,620,791 B1 * | 11/2009 | Wentzlaff et al. | 711/202 |
| 2005/0251613 A1 * | 11/2005 | Kissell | 711/1 |

* cited by examiner

*Primary Examiner*—Mardochee Chery
(74) *Attorney, Agent, or Firm*—Scully, Scott, Murphy & Presser, P.C.; Daniel P. Morris, Esq.

(57) ABSTRACT

A memory system and method for providing atomic memory-based counter operations to operating systems and applications that make most efficient use of counter-backing memory and virtual and physical address space, while simplifying operating system memory management, and enabling the counter-backing memory to be used for purposes other than counter-backing storage when desired. The encoding and address decoding enabled by the invention provides all this functionality through a combination of software and hardware.

27 Claims, 2 Drawing Sheets

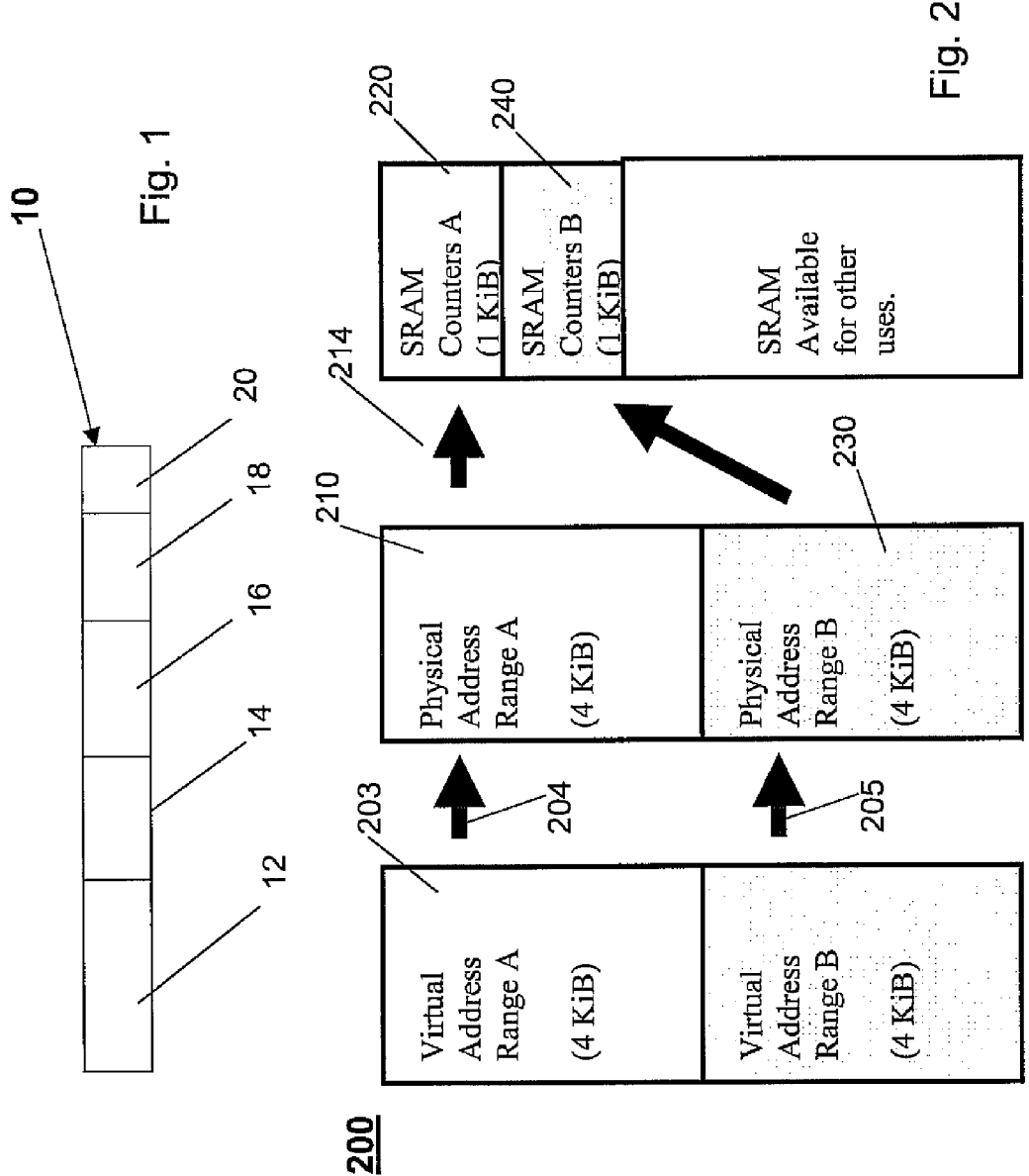

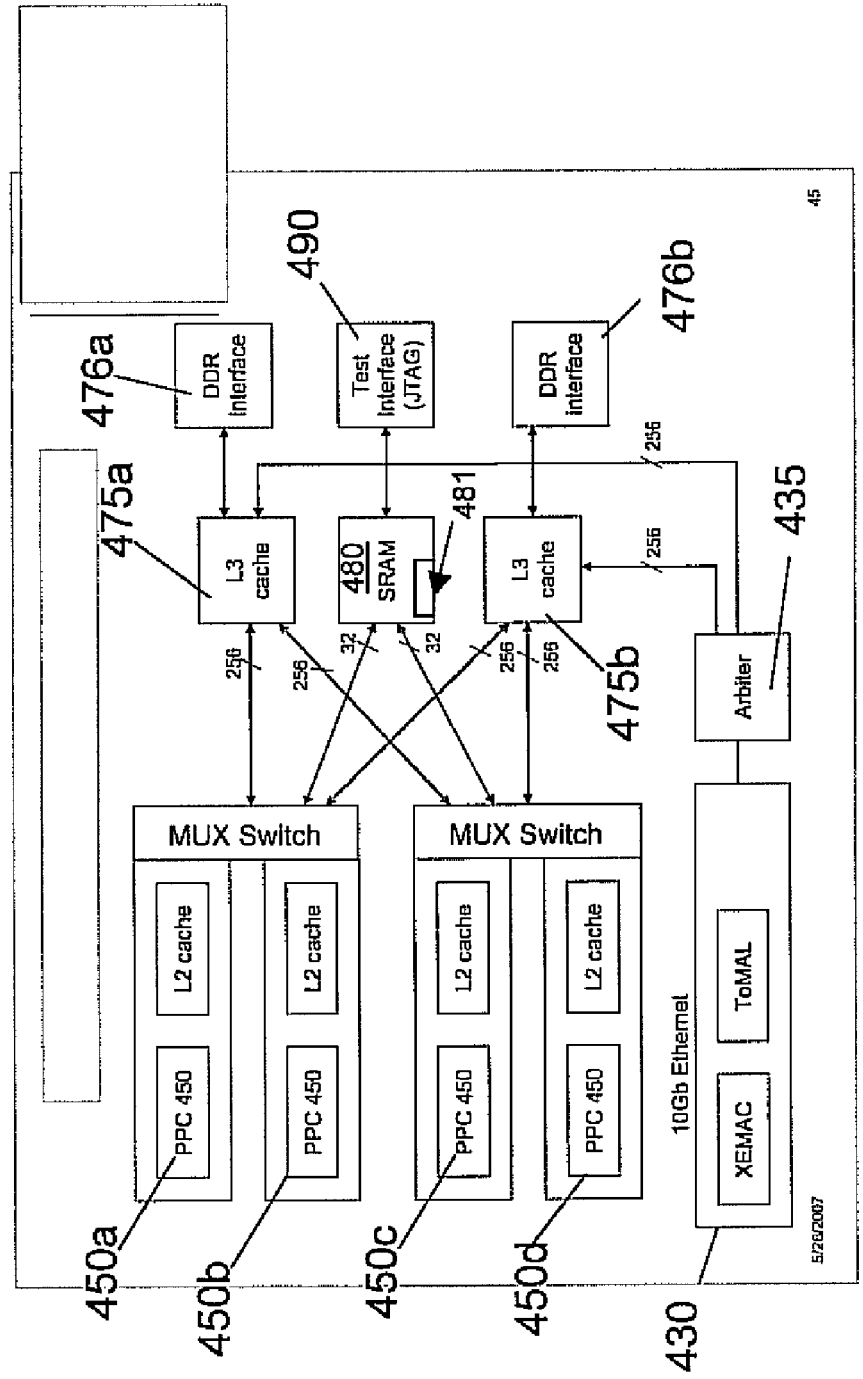

CONFIGURABLE MEMORY SYSTEM AND METHOD FOR PROVIDING ATOMIC COUNTING OPERATIONS IN A MEMORY DEVICE

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Serial No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

The present invention generally relates to memory architectures in computer systems and, more particularly, to a configurable memory storage device and method enabling atomic counting operations in the memory storage device structures.

2. Description of the Prior Art

Massively parallel computing systems employing System-On-A-Chip (SOC) technology are known. Such a computing system requires careful control of cost per processing node, power and packaging, a major component of which is the SOC chip size and complexity. Furthermore, operating system and applications that exploit this parallel system require high performance atomic operations between the multiple processing elements (cores) within the SOC to achieve scalability.

Memory-based atomic operations are known in computing environments. However, these atomic operations either support insufficient functionality, or require excessive chip area or memory footprint, or require operating systems difficulty in memory system management. In the prior art, storage is dedicated to this functionality, making it difficult or impossible to utilize that memory and chip area for other purposes, or to most flexibly assign that memory to multiple clients.

Notwithstanding the innovations of the prior art, it would thus be highly desirable to provide an improved configurable memory and memory-based atomic operation scheme for one or more processor devices in a multiprocessing computer environment in a simple and cost-effective manner.

As a common bottleneck for inter-processor memory access is the exchange of software locks, it would be further desirable to provide in a configurable memory system for a multiprocessor environment atomic load-and-update functionality especially tailored for handling lock exchanges accessible by all processor cores using only a single load instruction.

SUMMARY OF THE INVENTION

The present invention is directed to a novel memory and memory addressing scheme that can be configured to enable memory-based atomic operations for one or more processors in a multiprocessing environment.

In one aspect, such memory-based atomic operations include atomic load-and-update functionality especially tailored for counter-backing memory storage.

In another aspect, such memory-based atomic operations include atomic load-and-update functionality especially tailored for many other purposes besides counter-backing memory storage.

In a related aspect, such novel memory and memory addressing scheme configured to enable memory-based atomic operations is designed to simplify operating system memory management.

In a further related aspect, a method and apparatus is taught to provide atomic memory-based counter operations to operating systems and applications that make most efficient use of counter-backing memory and virtual and physical address space.

Moreover, a novel technique for operation encoding and address decoding that provides all this functionality is provided through a combination of software and hardware.

Thus, in accordance with one aspect of the invention, there is provided a system for performing atomic counter operations in a memory storage device provided in a computer processing system including a processor device that issues physical memory addresses for accessing a memory location in a memory storage device, the system comprising:

means receiving the physical memory address from an issuing processor, the memory address including instruction bits specifying an atomic counter operation to be performed at a memory location; and, means for removing the instruction bits from the received memory address to form a further memory address used in selecting the memory address location in the memory storage device, wherein an atomic counter operation is to be performed at the further memory address according to the instruction bits.

Further to this aspect of the invention, the instruction bits represent an operational code for performing the atomic counter operation that is embedded in the physical memory address. The op code representing one or more atomic counter operations that may be performed include one or more of: fetch-and-clear, fetch-and-increment, and fetch-and-decrement operations.

Moreover, further to this aspect of the invention, the physical memory address from an issuing processor further includes one or more bits designating one or more contiguous set of counters in the memory storage device, each counter allocated for the atomic counter operations.

In a further embodiment, a counter in the memory storage device is used as a software lock, the physical memory address from an issuing processor further including one or more bits designating a lock number representing locks held by a processor.

In accordance with a further aspect of the invention, there is provided a method for performing atomic counter operations in a memory storage device provided in a computer processing system including a processor device that issues physical memory addresses for accessing a memory location in a memory storage device, the method comprising:

embedding one or more instruction bits in a physical memory address to specify an atomic counter operation to be performed at a memory location;

receiving, at a decoder device, the physical memory address including the instruction bits from an issuing processor; and, removing the instruction bits from the received memory address to form a further memory address, the further memory address used in selecting the memory address location in the memory storage device where an atomic counter operation is to be performed according to the instruction bits.

Still further, there is provided address decoder device for use with a memory storage structure associated with a processor, the device comprising:

means for receiving a physical memory address from the processor device, the memory address including instruction bits specifying an atomic counter operation to be performed at a memory location within the memory storage structure; and, means for removing the instruction bits from the received memory address to form a further memory address used in selecting the memory address location in the memory storage device, wherein an atomic counter operation is to be performed at the further memory address according to the instruction bits.

Moreover, according to a further aspect of the invention, there is provided a computer program storage device, readable by machine, tangibly embodying a program of instructions executable by a machine to perform atomic counter operations in a memory storage device provided in a computer processing system including a processor device that issues physical memory addresses for accessing a memory location in a memory storage device, the method steps comprising:

embedding one or more instruction bits in a physical memory address to specify an atomic counter operation to be performed at a memory location;

receiving, at a decoder device, the physical memory address including the instruction bits from an issuing processor; and, removing the instruction bits from the received memory address to form a further memory address, the further memory address used in selecting the memory address location in the memory storage device where an atomic counter operation is to be performed according to the instruction bits.

Moreover, according to these aspects of the invention, the instruction bits represent an operational code for performing the atomic counter operation that is embedded in the physical memory address. The op code representing one or more atomic counter operations that may be performed include one or more of: fetch-and-clear, fetch-and-increment, and fetch-and-decrement operations.

Further to this aspect of the invention, there is further provide a step of utilizing one or more bits in the physical memory address for designating one or more contiguous set of counters in the memory storage device, each counter allocated for the atomic counter operations.

In an example embodiment, a memory storage device counter is used as a software lock, the method further comprising: utilizing one or more bits in the physical memory address for designating a lock number representing locks held by a processor.

In a further example embodiment, the method includes configuring, by a memory manager device, one or more contiguous sets of counters in the memory storage device, each contiguous set of counters for assignment to separate uses or processes.

In a further example embodiment, the method includes determining, at the decoder device, from other select bit values of the received physical memory address whether the processor is accessing a memory location in the memory storage device allocated for performing atomic counter operations, or for direct load and store operations.

Thus, in one advantageous application, novel memory and memory addressing scheme configured to enable memory-based atomic operations is used for handling lock exchanges accessible by all processor cores using only a single load instruction. This hardware locking functionality provides support for synchronization between the multiple processors in a multiprocessor system and the orderly sharing of the resources.

Besides locks, further advantageous use of memory-based atomic counting operations by kernel and application software alike, include use as counters, semaphores, mutual exclusion and queue management functionality where atomic number are provided.

The present invention is advantageously employed in a multiprocessing computer system, which may be implemented in System-on-Chip integrated circuit designs having a plurality of processor devices each for access a shared memory structure, e.g., an embedded SRAM, however, can easily be adapted for use in uniprocessor computer systems.

BRIEF DESCRIPTION OF THE DRAWINGS

The objects, features and advantages of the present invention will become apparent to one skilled in the art, in view of the following detailed description taken in combination with the attached drawings, in which:

FIG. 1 shows one example embodiment of an addressing scheme used by hardware and software for addressing the atomic counters of the present invention;

FIG. 2 is a diagram depicting an example of an additional level of translation that is employed to efficiently map counters while preserving additional SRAM for other uses in accordance with the present invention; and FIG. 3 depicts a high level schematic diagram illustrating a single computing node ASIC 400 in which the present invention may be employed.

DETAILED DESCRIPTION OF THE PREFERRED EMBODIMENTS

The present invention provides a novel memory and memory addressing scheme that can be configured to enable memory-based atomic operations for one or more processors in a multiprocessing environment. In one aspect, such memory-based atomic operations include atomic load-and-update functionality especially tailored for counter-backing memory storage. However, it is understood that, such memory-based atomic operations include atomic load-and-update functionality especially tailored for other purposes besides counter-backing memory storage.

In one example embodiment, when used for general purpose access, the configurable memory system includes an addresssable memory storage device such as a non-volatile memory device, e.g., SRAM, which may any form of electronic, magnetic or optical storage providing shared storage for the one or more processors in the multiprocessor environment. In the description as follows: an example SRAM has a capacity of approximately 32 KB having a single contiguous image that is protected by ECC. This image supports all standard read/write/execute access by the one or more processors in the multiprocessor environment. The SRAM address, in an example implementation, may be 32 bits wide and will support arbitrary R/W access.

In one example implementation provided only for purposes of illustration, the configurable SRAM of the present invention may be used to support a set of counters that can be read and operated upon in an atomic manner allowing for one large number of available counters. A separation between general purpose access and locks and barriers is determined by the system software executing in the computing system. The counters are all accessed via a 32 KB image of physical memory space that is an alias to the same physical SRAM address in the SRAM module. That is, counter access is provided from multiple different paths to the same device on the chip, e.g., one path for "normal" load/store/execute and, another for locks/barriers (which gets further specialized for opcode and chunk), another for ECC, etc.). The mapping between the physical memory address and the SRAM address is described herein with respect to Table 2 shown below.

In the example implementation described herein, a physical address map for the SRAM itself is shown in Table 1. In this example map, separate physical address ranges are set forth through which the SRAM may be used for direct load-store-execute access, or for atomic counter access, as needed for a particular application.

TABLE 1

| Address max/min | R/W | Function |
| --- | --- | --- |
| 0x7 ffff ffff<br>0x7 ffff 8000 | R/W | General purpose SRAM can be accessed as 32 bits or 128 bits (128 bits is handled by a bus by converting into four 32 bit reads). This is the top of memory as it is where a processor core will boot |
| 0x7 ffff 7fff<br>0x7 ffff 0000 | R/W | Counters with atomic load + op access (see below for detailed explanation) This corresponds to 4 different opcodes for a maximum of 2k 32 bit counters. (only uses maximally ¼ of the SRAM) Also includes an operation that lets one write (initialize) a counter. |
| 0x7 fffe ffff<br>0x7 fffe 8000 | R/W | Direct access for ECC. Only word accesses supported. |
| 0x7 fffe 7fff<br>0x7 fffe 0000 | R/W | Uncorrected data access. Only word accesses supported. |
| 0x7 fffd ffff<br>0x7 fffd 0000 | R/W | Error counters and first error event capture |

Through this addressing scheme, the SRAM can be flexibly apportioned between load-store access versus groups of locks (a "chunk") that facilitates a configurable amount of memory dedicated to atomic counter functionality. Additional physical address ranges are provided for direct access to Error Correction codes and system debugging. The memory map for the SRAM and locks only decode the address bits needed to distinguish the above. Other addresses are aliased into this same address space. That is, all these physical address ranges are aliases, in that they reference the same device (the SRAM) on the chip, but each alias provides a different function (atomic counter, ECC access, direct load/store/execute, etc.) that operates on the single SRAM device. Note as will be described in greater detail herein below, when referencing the SRAM via the alias that refers to atomic counters, there is a further level of aliasing (different addresses for the same thing) where each of the different aliases (created by the opcode field) corresponds to a different atomic function. That is, the opcode part of the address is the additional level of alias, but rather than aliasing the entire SRAM device, the 32 bit words are aliased within the device with aliases that encode a particular function.

FIG. 1, in conjunction with physical memory address to SRAM address mapping shown in Table 2 below, depicts one example embodiment of an addressing scheme 10 used by hardware and software for addressing the atomic counters in a configurable memory system (an SRAM device) in which the present invention is employed. As shown in FIG. 1, in one non-limiting example, the addressing scheme 10 employs a 32 bit wide address having certain bits designated for controlling memory-based atomic operations include atomic load-and-update functionality, e.g., tailored for counter-backing memory storage according to the invention. It is understood however, that this concept is extendable to 64 bit machines or larger.

TABLE 2

| Physical Address | SRAM address | Function |
|---|---|---|
|  | 0:1 | Always b"00" |
| 17:20 | 2:5 | Chunk number |
| 21:22 | Used to determine op-code | b"00": atomic fetch (read/write)<br>b"01": atomic fetch with increment (saturate at 0xffffffff)<br>b"10": atomic fetch with decrement (saturate at 0x00000000)<br>b"11": atomic fetch with clear |
| 23:29 | 6:12 | Lock number |

For example, a first number of bits comprising bit address field 12 of addressing scheme 10 includes an address for accessing a virtual/physical page address. This field 12 may comprise bits 0-16 of the processor issued virtual/physical page address accessing the SRAM, however, when resolved by a decoder device at the SRAM maps to bits 0:1 of the SRAM address. A second field of address bits 14 in addressing scheme 10 includes chunk number designation indicating a group of locks, held by a processor, for example or, for example, a continuous set of counters. This field 14 may comprise physical address bits 17:20 of the processor issued virtual/physical page address and mapped to bits 2:5 of the resolved SRAM address. A third field of address bits 16 of addressing scheme 10 includes op codes for controlling memory-based atomic operations include atomic load-and-update functionality, e.g., tailored for counter-backing memory storage. This atomic load-and-update op code field 16 may comprises physical address bits 21:22 of the issued virtual/physical page address and is extracted by the SRAM decoder functionality to implement the fetch and counter operation as specified by the Op Code value extracted. It should be understood that, when the SRAM device is accessed via the normal load/store/execute path, the OpCode field is not used as an OpCode, but just used as the normal part of the address. A fourth field of address bits 18 in addressing scheme 10 includes lock number within the "chunk" 14 designation of locks held by a processor, for example. This field 18 may comprise physical address bits 23:29 of the of the issued virtual/physical page address and mapped to bits 6:12 of the resolved SRAM address. A fifth field of address bits 20 in addressing scheme 10 includes a "zeros" designation, for example. This field 18 may comprise physical address bits 30:31 of the of the issued virtual/physical page address. Thus, for example, when addressing 32 bit (4 byte) things via address 10 shown in FIG. 1, these are by convention aligned on 32 bit (4 byte) boundaries, so the low-order 2 bits need to be zero. Similarly, in the context of 64 bit locks, the low-order 3 bits would be zero.

According to the invention, as mentioned with respect to FIG. 1, address bit field 16 (encoded Op Code field in the address layout 10) is extracted by the address decoder. That is, starting from a concatenation of the address bits shown in FIG. 1 in fields 12|14|16|18|20, the counter decoder reformats this into "12|14|18|20" (squeezing out field 16) but remembering the value of field 16 to indicate what operation is desired on the SRAM 32 bit word indicated by remaining SRAM device address "12|14|18|20". Then the address decoder will first determine if the Op Code field is zero (e.g., indicating load and store functionality) or, non-zero (e.g., indicating atomic fetch and increment memory counter), and upon the determination, will know whether it has to implement the fetch in addition to the counter-backing memory storage operation functions as described in Table 2, as follows:

Op code bits "00" is for initiating an atomic fetch operation (e.g., read/write) for an SRAM lock or queue element;

Op code bits "01" is for initiating an atomic fetch operation (e.g., read) with increment for an SRAM look or queue element;

Op code bits "10" is for initiating an atomic fetch (e.g., read) with decrement for an SRAM lock or queue element; and, Op code bits "11" is for initiating an atomic fetch (e.g., read) with clear for an SRAM lock or queue element.

It should be understood that, from Table 2, these same areas of memory, i.e., the actual storage locations in the SRAM device which are accessed for different purposes (normal, atomic counter, ECC, etc.) via different physical/virtual addresses, are mapped into the normal access (as well as the uncorrected access). These atomic counters can be initialized by writing from the normal memory space or, by writing with opcode b"00". Writing to any other opcodes will generate an exception. It is further understood that ECC is maintained for the counters in the same manner as for data. It is further understood that only opcode "00" allows for word writes. Writes are not supported for any of the non-zero opcode area. All reads for this image are word (32 bit) reads, in one example embodiment All other accesses will result in an exception.

Further, the other Op Code operations "01", "10" and "11" shown in Table 2 function to return the current value and internally increment, decrement or clear, respectively, the counter value in memory. Thus, an application may view what the counter value was prior to modifying (atomic increment/decrement or clear). Thus, given two processors or thread are competing over a lock and attempting to access a counter with a fetch and increment, for example, and given an initial condition of "00", the first processor will read it and see it is a zero (0) and will cause the lock to go to "1" due to implementation of the atomic counter update; the second processor will get their next will see that it is a one (1) and will cause the lock to go to "2" as a result of implementing the atomic counter update function. Incrementing a counter involves a read-modify-write operation that is performed by hardware, triggered by a single read operation performed by the processors. Without the hardware support, a processor would require a minimum of 3 separate instructions (read, modify (e.g., increment), and write), which is an interruptible, non-exclusive sequence of operations.

Thus, the atomic SRAM memory operations permit software to create mutual exclusion or other functions that require atomic access. For example, if a lock is zero that means some resource is free; a processor requesting that resource will win if the value is zero, and if the processor does not get zero that processor will lose that resource. As another example, an array or queue element is specified, and the number returned from the lock may be an index into the queue element. That is, if a zero value is returned from the lock, a processor issuing a fetch and inc. will own queue element 0. A second processor issuing a fetch and inc. will receive a one value from the lock, then that processor owns queue element 1. This can be used as a head and tail counters that can be managed in a circular fashion. That is, the counters can be used to assign queue elements in a first-come, first-served basis, where the locks may be accessed by the processor devices. In an array of 16 queue elements, e.g., or any array comprising a power of 2 queue elements, the counters enable circular queue management. For example, a circular queues may be implemented by software to hand-off work-orders between multiple processing elements in a client-server fashion, or for enqueing communication data to be transmitted when network resources become available. An additional use for atomic counters is to manage and control the allocation of precious resources within a node. Imagine that there is a pool of 8 instances of some precious hardware or software resource. Software, via OpCode "00" would write the value 8 as the initial condition of the counter. Software that wishes to utilize or own one of these resources can claim it by issuing a fetch-and-decrement operation to the counter controlling the allocation. If that fetch-and-decrement returns the value 0, then no resource is available and software must wait, periodically retrying the operation. If the fetch-and-decrement returns a value greater then 0, then the resource is automatically claimed and removed from the available resource pool. When finished with the precious resource, it is returned to the pool via a fetch-and-increment operation.

The address scheme and mapping functionality into an SRAM array is unique in that several levels of translation are provided. FIG. 2 shows the levels of translation employed in this invention. Software accesses memory and devices, including the SRAM and/or Atomic Counters, via Virtual Addresses 203. Hardware (including TLB buffers 204) in the processor translates these virtual addresses 203 to physical addresses 210 which are presented by the processor to the address decoder logic. The decoder logic 214 examines the physical address to distinguish SRAM, Counters, or Other (e.g., DDR) using address bit field 12 of FIG. 1 to differentiate. If address bit field 12 is found to correspond to Counters, an additional translation extracting the op code is performed to construct an SRAM array device address indicating a particular counter in a particular counter group. Thus, in one level, virtual address space is translated to physical address and, in another level, the Op Code bits are extracted out of the physical memory address to form the SRAM address. This enables an increased density of locks in the SRAM. Moreover, the chunk numbers are selected from upper bits of the virtual/physical memory address (e.g., 32 bits) and the operating system (O/S) maps that memory in 32 bit space (using the processor's translation look aside buffers (TLB's)). In one embodiment, the location for the chunks is selected such that the correspondence between a chunk number and the natural size of the processor's TLB's, enables more flexible controlled access to the locks, i.e., the chunks of locks correspond well to available TLB sizes and allows easier TLB mapping by creating counter groups that fill a virtual/physical page of address space, but which is mapped onto a smaller/denser SRAM array device range. At the same time, this frees up other SRAM space for direct load/store/execute access.

FIG. 2 is a diagram 200 depicting these example levels of translation that is employed to efficiently map counters while preserving additional SRAM for other uses in accordance with the present invention. For example, via the scheme depicted in FIG. 2, all, none or part of the SRAM can be assigned to atomic counter access. This partitioning is done via the upper bits "chunk number" field shown in FIG. 1, that allocates a contiguous set of counters in the SRAM. In one example embodiment, a "chunk" consists of 128 locks that occupy 512 bytes of SRAM (128 locks*4 bytes/lock), but is mapped into 2 Kilobytes of Virtual and Physical Space. That is, as shown in FIG. 2, in one example implementation, two chunks are indicated—one that that maps 4 KB of physical/virtual address space 210 into to 1 KB of SRAM space 220 providing counters allocated for a kernel application (for example), and, another chunk that maps 4 KB of physical/virtual address space 230 into to 1 KB of SRAM space 240 providing counters allocated for the software application. The organization of the chunks enables use of the fewest translations (TLBs) (from virtual space to physical space) which are indicated by arrows 204 and 205 that translate the virtual memory address Range A into a physical memory address Range B, to provide this functionality. For example, virtual address range A use 1 TLB 204 to separate kernel-owned locks and another TLB 205 is used to separate application-owned locks.

Thus, in this addressing scheme, the hardware utilizes an extra level of translation that squeezes the opcode field out of the virtual and physical address used by software and first-level decode, and reconstructs the actual SRAM array address in a more dense fashion as shown in FIG. 2. For example, in one methodology employed, the hardware decoder, receiving a physical address will first look at some combination (e.g., pattern) of upper bits of the physical memory address to decide if the SRAM counters or straight SRAM is being accessed. That is, the hardware decodes from the pattern (e.g., encoded upper bits address bits, e.g., address 0x7 which may correspond to a normal load/store or device or counter space as shown in Table 1 in an example implementation) the physical page address to differentiate direct SRAM address range (for normal load-store operations) from the counter address range (for a memory counter access). Then, if it is a counter access, the hardware will look at the op code, remembers the op code function to be executed on the memory, and simultaneously reconstructs the SRAM address with the op code bits removed via hardware. The function executed on the memory, as determined by the chunk number, op code, and lock number, may be a straight read/write (non-counter access) or, if a counter access, the particular Op Code function (read+increment) or (read+decrement) or (read+clear) will be executed by the decoder in the SRAM memory. In other words, the address decoder logic contains additional (not just simple read/write) hardware that performs mathematical operations (increment, decrement, clear) operations on the memory, and which not only performs a "read" but modifies then writes back to the SRAM device, the contents. Typically, a decoder would cause only a read to occur, but the address decoder device of the implemented in the invention reads, modifies, and then writes (RMW) the data. Moreover, when performing the RMW operation, the SRAM decoder logic blocks other accesses (including RMW operations) to that same location, producing an atomic update.

This scheme make most efficient use of SRAM, and more importantly allows the operating system to make most efficient use of the Translation Look-aside Buffers (TLBs) when mapping the counters in the Virtual Memory Manager (VMM).

Moreover, the SRAM counters benefit from exactly the same parity or ECC logic as would for normal functioning to prevent a bit error from entering into the locks. That is, the same ECC protection utilized for the SRAM may be utilized to protect the counters, which is an additional cost savings.

However, certain uses of the machine require more direct load-store access to SRAM and less atomic counters. In such cases, the SRAM can be reclaimed from counter use and allocated for other purposes. This preserves chip area and system cost, and keeps the operating system's Virtual Memory Mapping simple.

The present invention is advantageously employed for many computing system architectures. One such architecture includes the "BlueGene/P" high-performance computing system, such as available from International Business Machines Corp. (IBM) where a compute node is provided comprising an indivisible multi-processor unit, formed of System-on-Chip (SOC) technology, that includes, for example, a plurality of processors each with one or more levels of cache. In one embodiment, the present invention is implemented in a processing node of a Massively Parallel Supercomputer architecture such as shown and described in greater detail in commonly-owned, co-pending U.S. patent application Ser. No. 11/768,905 that comprises multiple processing nodes organized in one form, as a three-dimensional torus interconnected and designed to deliver processing power on the order of a petaflops (a quadrillion floating-point operations per second) for a wide range of applications. In an exemplary embodiment, the Massively Parallel Supercomputer architecture comprises 72 K processing nodes organized as a 72×32×32 with each compute node being connected to six (6) neighboring nodes via 6 bi-directional torus links.

FIG. 3 particularly illustrates a block diagram depicting a single computing node ASIC 400 in which the present invention may be employed. Each node preferably is based on the chip process that integrates all the functions of a computer into a single compute ASIC, enabling dramatic reduction of node size and power consumption. In a supercomputer, this can be further leveraged to increase node density thereby decreasing the overall cost/performance for the machine. As shown in FIG. 3, the ASIC of this design, which may function as both a compute node and an I/O node in the system, include four processing cores, e.g., cores 440a, ... 440d, each having a "double" floating point unit (not shown), that may include two coupled standard floating point units. This arrangement gives a peak performance of four floating point operations per processor core per clock cycle. The processor core, in one embodiment, is a PowerPC450 embedded core available from IBM microelectronics, although future versions of this core may be used as technology improves. The "Double" FPU unit increases the data bandwidth by increasing the datapath from 64 bits to 128 bits to allow for quadword Floating Point loads and stores (i.e., data moving).

As shown in FIG. 3, the node 400 further incorporates other functions into the ASIC. Besides the embedded processing core and floating point cores, the system includes embedded DRAM 475a, 475b an integrated external DDR2 memory controller, DMA (not shown), 10 Gb Ethernet functionality as well as network link cut-through routing buffers and routing control block that allow any two nodes to communicate with low latency. The compute node particularly includes four embedded cores, such as the PPC450, each capable of being utilized for message handling and computation operations.

Also included in a node 400 is a Scratch SRAM 480, provided to serve as a background communication mechanism with a host system (not shown). All four cores have equal access to the SRAM which is critical for the independent exchange of messages between each core and the host system. The size of the Scratch SRAM may range on the order of 32 KB-128 KB. It is within this SRAM that a decoder mechanism 481 is provided for mapping the physical/virtual memory address into the SRAM space, providing the counters space for atomic operations, and performing the atomic memory counter operations according to the present invention.

Further in FIG. 3, there is additionally provided two DDR-2 controllers 476a,b that enable use of the low cost commodity DDR-2 external memory. As mentioned, the latency to this external memory is one of the critical design parameters and different memory configurations may be supported with the internal DDR-2 controller thereby allowing many system memory configurations.

In a preferred embodiment, the same compute node ASIC may be used as an I/O node which is associated with a subset of the compute nodes (16, 32, 64, or 128 compute nodes), for handling fileserver communication and I/O operations. That is, the I/O nodes are identical to the compute nodes. The only difference is that an I/O node enables and uses an external network interface 430, such as a 10 Gigabit Ethernet. It is understood that the compute ASIC nodes may have the integrated 10 Gb Ethernet. The 10 Gb Ethernet functional units (XEMAC, ToMAL) interfaces to an arbiter 435 which arbitrates inputs to L3 level cache from torus DMA and from 10 Gb Ethernet. This allows the processor within a node to set up a transfer and return to handling messages with very little overhead.

The node ASIC additionally includes the functionality necessary to boot, debug and support RAS (reliability, availability and serviceability). On the ASIC, this functionality is provided by an extension of the IEEE1149.1-1993 standard, also known as the JTAG standard. As in the predecessor system (described in the disclosure "A Novel Massively Parallel Supercomputer, KR537582, November 2005), extensive use is made of these JTAG TDRs for chip self test functions, for boot code loading, for chip configuration and control, for monitoring and for debug. In particular, each of the PPC450 cores has a slave JTAG interface 490 that can be used with the IBM RiscWatch™ software for detailed debug operations of each PPC450 core.

From a full system perspective, the supercomputer as a whole is controlled by a Service Node (not shown), which is the external computer that controls power-up of the machine, partitioning, boot-up, program load, monitoring, and debug. The Service Node runs the Control System software. The Service Node communicates with the supercomputer via a dedicated, private 1 Gb/s Ethernet connection (not shown).

More particularly, with respect to the compute node memory system, there is included an on-chip cache hierarchy, an off-chip main store, and optimized on-chip support for locking and communication between the four ASIC processor cores 440a, ..., 440d. The memory system is architected for peak performance over a range of target applications. The aggregate memory of the machine is completely distributed in the style of a multi-computer, with no hardware sharing between nodes. Each node may own, for example, 2 gigabytes of physical memory, resulting in a total of 144 terabytes in a 72 K-node system. As shown in FIG. 1, the physical memory of the node is shared by the four processors within the ASIC, and the hardware provides optional coherence support.

Although not shown in FIG. 3, each processor core includes a first-level L1 cache comprising an instruction cache (L1 I-cache) and a data cache (L1 D-Cache), which are each both part of the 450 core macro. The data cache produces two separate 128-bit data buses to and from L2, one for reading and one for writing. Unlike the previous generation, the PowerPC 450 core provides hardware support for cache coherence for write-invalidate cache coherence protocol for multicore coherence. The nodal memory system additionally includes a main store (not shown) that may comprise double-data rate (DDR2) DRAM. It is built from commodity double-data rate synchronous DRAM (SDRAM DDR-2) devices and which may be external to the node ASIC.

FIG. 3 further depicts the overall architecture of L2 and L3. Second-level L2 cache is relatively smaller and basically serve as a prefetch and write-back buffers for the third-level (L3) cache which is larger. In one embodiment, multiplexer (i.e., MUX) switches 431,a, 431b connect four (4) L2 level caches to two (2) memory banks of L3 at 4 MB capacity each. L3 is shared by instructions and data, and provides high-bandwidth, low-power access to the working set of most applications. The L3, being integrated on the SOC, has higher bandwidth and shorter latency, and it greatly eases the memory wall problem.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A system for performing atomic counter operations in a memory storage device provided in a computer processing system including a processor device that issues physical memory addresses for accessing a memory location in a memory storage device, said system comprising:
   means for receiving said physical memory address from an issuing processor, said physical memory address including embedded instruction bits, said embedded instruction bits representing an operational code for specifying an atomic counter operation to be performed at a memory location; and,
   means for removing said instruction bits from said received memory address to form a further memory address used in selecting said memory address location in said memory storage device, wherein an atomic counter operation is to be performed at said further memory address according to said instruction bits,
   wherein said physical memory address from an issuing processor further includes one or more bits to further designate contiguous sets of counters in said memory storage device, each counter allocated for performing said atomic counter operations.

2. The system as claimed in claim 1, wherein said atomic counter operation performed includes one or more of: fetch-and-clear, fetch-and-increment, and fetch-and-decrement operations.

3. The system as claimed in claim 1, wherein a counter is used as a software lock, said physical memory address from an issuing processor further including one or more bits designating a lock number representing locks held by said processor.

4. The system as claimed in claim 3, wherein said contiguous set of counters in said memory storage device are configurable by a memory manager device that assigns a contiguous set of counters to separate uses or processes in alignment with existing number and size of a Translation Look-aside Buffer (TLB) implemented by said memory manager.

5. The system as claimed in claim 1, further comprising means implementing logic for first determining from other select bit values of said received physical memory address whether said processor is accessing a memory location in said memory storage device allocated for performing atomic counter operations, or for direct load and store operations.

6. The system as claimed in claim 1, wherein said computer processing system for providing said atomic counter operations is embedded in a System-on-Chip integrated circuit.

7. The system as claimed in claim 1, wherein said memory storage device comprises an SRAM device embedded in a System-on-Chip integrated circuit, the SOC employing said SRAM device to serve as counter storage locations for programmed applications.

8. A method for performing atomic counter operations in a memory storage device provided in a computer processing system including a processor device that issues physical memory addresses for accessing a memory location in a memory storage device, said method comprising:
   embedding one or more instruction bits in a physical memory address, said embedded instruction bits representing an operational code to specify an atomic counter operation to be performed at a memory location;
   receiving, at a decoder device, said physical memory address including said instruction bits from an issuing processor; and,
   removing said instruction bits from said received memory address to form a further memory address, said further memory address used in selecting said memory address location in said memory storage device where an atomic counter operation is to be performed according to said instruction bits, and,
   utilizing one or more bits in said physical memory address to further designate contiguous sets of counters in said memory storage device, each counter allocated for performing said atomic counter operations.

9. The method as claimed in claim 8, wherein said atomic counter operation performed includes one or more of: fetch-and-clear, fetch-and-increment, and fetch-and-decrement operations.

10. The method as claimed in claim 8 wherein a counter is used as a software lock, said method further comprising:
   utilizing one or more bits in said physical memory address for designating a lock number representing locks held by said processor.

11. The method as claimed in claim 8, further comprising:
   configuring, by a memory manager device, one or more contiguous sets of counters in said memory storage device, each contiguous set of counters for assignment to separate uses or processes.

12. The method as claimed in claim 8, further comprising:
   determining, at said decoder device, from other select bit values of said received physical memory address whether said processor is accessing a memory location in said memory storage device allocated for performing atomic counter operations, or for direct load and store operations.

13. A multiprocessor computing system comprising one or more processor devices and a memory having addressable locations for storing data for said one or more processor devices, a said processor device adapted for issuing physical memory addresses when accessing a memory location in a memory storage device, said system comprising:
   means for receiving said physical memory address from an issuing said one or more processors, said memory address including instruction bits specifying an atomic counter operation to be performed at a memory location; and,
   means for removing said instruction bits from said received memory address to form a further memory address used in selecting said memory address location in said memory storage device, wherein an atomic counter operation is to be performed at said further memory address according to said instruction bits,
   wherein said physical memory address from an issuing processor further includes one or more bits designating contiguous sets of counters in said memory storage device, each counter allocated for performing said atomic counter operations.

14. The multiprocessor computing system as claimed in claim 13, wherein said atomic counter operation performed includes one or more of: fetch-and-clear, fetch-and-increment, and fetch-and-decrement operations.

15. The multiprocessor computing system as claimed in claim 13, wherein a counter is used as a software lock, said physical memory address from an issuing processor further including one or more bits designating a lock number representing locks held by each of said one or more processors.

16. An address decoder device for use with a memory storage structure associated with a processor, said device comprising:
  means receiving a physical memory address from said processor device, said memory address including instruction bits specifying an atomic counter operation to be performed at a memory location within said memory storage structure; and,
  means for removing said instruction bits from said received memory address to form a further memory address used in selecting said memory address location in said memory storage device, wherein an atomic counter operation is to be performed at said further memory address according to said instruction bits,
  wherein said physical memory address from said processor further includes one or more bits designating contiguous sets of counters in said memory storage device, each counter allocated for performing said atomic counter operations.

17. The device as claimed in claim 16, wherein said instruction bits represent an operational code for performing said atomic counter operation, said operational code representing one or more atomic counter operations including: fetch-and-clear, fetch-and-increment, and fetch-and-decrement operations.

18. The device as claimed in claim 17, wherein said means for removing said instruction bits from said received memory address further comprises means for remembering the value of said instruction bits for indicating what operation is desired on the memory storage structure.

19. The device as claimed in claim 16, further comprising:
  means responsive to said op code representing said one or more atomic counter operations for performing a read-modify-write operation at a location in said memory storage structure that is triggered by a single read operation performed by said processor.

20. The device as claimed in claim 19, wherein said means responsive to said op code further blocks other accesses to that same memory storage structure location, for producing an atomic update.

21. The device as claimed in claim 19, wherein a counter is used as a software lock, said physical memory address from an issuing processor further including one or more bits designating a lock number representing locks held by said processor.

22. The device as claimed in claim 16, wherein said memory storage device is a Random Access Memory (RAM) device, said RAM device further accessed by said processor via a normal load and store execution path, wherein said instruction bits are not used as an operational code, and are included as part of the address.

23. A computer program storage device, readable by machine, tangibly embodying a program of instructions executable by a machine to perform atomic counter operations in a memory storage device provided in a computer processing system including a processor device that issues physical memory addresses for accessing a memory location in a memory storage device, said method steps comprising:
  embedding one or more instruction bits in a physical memory address to specify an atomic counter operation to be performed at a memory location;
  receiving, at a decoder device, said physical memory address including said instruction bits from an issuing processor; and,
  removing said instruction bits from said received memory address to form a further memory address, said further memory address used in selecting said memory address location in said memory storage device where an atomic counter operation is to be performed according to said instruction bits, and,
  utilizing one or more bits in said physical memory address for designating contiguous sets of counters in said memory storage device, each counter allocated for performing said atomic counter operations.

24. The computer program storage device as claimed in claim 23, wherein said atomic counter operation performed includes one or more of: fetch-and-clear, fetch-and-increment, and fetch-and-decrement operations.

25. The computer program storage device as claimed in claim 24 wherein a counter is used as a software lock, said method further comprising:
  utilizing one or more bits in said physical memory address for designating a lock number representing locks held by said processor.

26. The computer program storage device as claimed in claim 23, further comprising:
  configuring, by a memory manager device, one or more contiguous sets of counter devices in said memory storage device, each contiguous set of counters for assignment to separate uses or processes.

27. The computer program storage device as claimed in claim 23, further comprising:
  determining, at said decoder device, from other select bit values of said received physical memory address whether said processor is accessing a memory location in said memory storage device allocated for performing atomic counter operations, or for direct load and store operations.

* * * * *